(12) United States Patent
Holmes et al.

(10) Patent No.: US 9,591,111 B1
(45) Date of Patent: Mar. 7, 2017

(54) MOBILE TERMINAL DEVICE

(71) Applicants: Niels Christian Roemer Holmes, Farum (DK); Peter Krohne Nielsen, Farum (DK); Jesper Falden Offersgaard, Farum (DK); Bjoern Kalmark Andersen, Farum (DK)

(72) Inventors: Niels Christian Roemer Holmes, Farum (DK); Peter Krohne Nielsen, Farum (DK); Jesper Falden Offersgaard, Farum (DK); Bjoern Kalmark Andersen, Farum (DK)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/985,882

(22) Filed: Dec. 31, 2015

(51) Int. Cl.
*H04M 1/00* (2006.01)
*H04M 1/02* (2006.01)

(52) U.S. Cl.
CPC ......... *H04M 1/027* (2013.01); *H04M 1/0264* (2013.01)

(58) Field of Classification Search
CPC ..... G06F 1/165; G06F 1/1626; H04M 1/0268
USPC ................. 455/566, 567, 575.1; 345/173
See application file for complete search history.

(56) References Cited

U.S. PATENT DOCUMENTS

| | | | |
|---|---|---|---|
| 7,662,544 B2 * | 2/2010 | Pawlowski | B29C 33/42 216/67 |
| 9,292,201 B2 * | 3/2016 | Joo | G06F 3/04886 |
| 9,300,772 B2 * | 3/2016 | Kim | H04M 1/0268 |
| 2014/0160789 A1 * | 6/2014 | Park | G02B 6/0023 362/608 |
| 2014/0240856 A1 * | 8/2014 | Allore | B29C 45/14311 359/811 |
| 2014/0240911 A1 * | 8/2014 | Cole | B29C 45/14311 361/679.3 |
| 2015/0229745 A1 * | 8/2015 | De Wind | H04M 1/0266 455/575.8 |
| 2015/0338701 A1 * | 11/2015 | Kim | G02F 1/133516 349/106 |

* cited by examiner

*Primary Examiner* — Sonny Trinh
(74) *Attorney, Agent, or Firm* — Na Xu; IPro, PLLC

(57) ABSTRACT

A mobile terminal device is disclosed. The mobile terminal device includes a display having a cover glass and an optical system assembled with the display. The cover glass has an active area for displaying information and an edge area connecting with the active area. The optical system includes an optical element integrated in the edge area of the display for forming an integral unit and a main lens cooperating with the optical system for capturing pictures and video footages, implementing illuminations, or the like.

4 Claims, 2 Drawing Sheets

MOBILE TERMINAL DEVICE

FIELD OF THE INVENTION

The present invention generally relates to the art of mobile terminal devices and, more particularly, to a mobile terminal device with an optical system for capturing pictures and video footages, implementing illuminations, or the like.

DESCRIPTION OF RELATED ART

Mobile terminal devices, such as mobile phones, tablets and laptops, generally include an optical system for taking pictures of objects. For example, a mobile terminal device has a display and an optical system set behind the display. In order to improve the desired quality, the optical system comprises wide filed adapters for increasing Field-of-View and tele-adapters for increasing magnification.

However, as the entire optical system must be behind the display, meaning that the display is occupying some of the allowed overall thickness of the mobile terminal device, thereby the desired functionality and/or quality of the optical system is often limited by the allowed thickness.

So, it is necessary to provide a new mobile terminal device for solving the problem mentioned above.

DETAILED DESCRIPTION OF THE EXEMPLARY EMBODIMENTS

Reference will now be made to describe exemplary embodiments of the present invention in detail.

Figure 1:
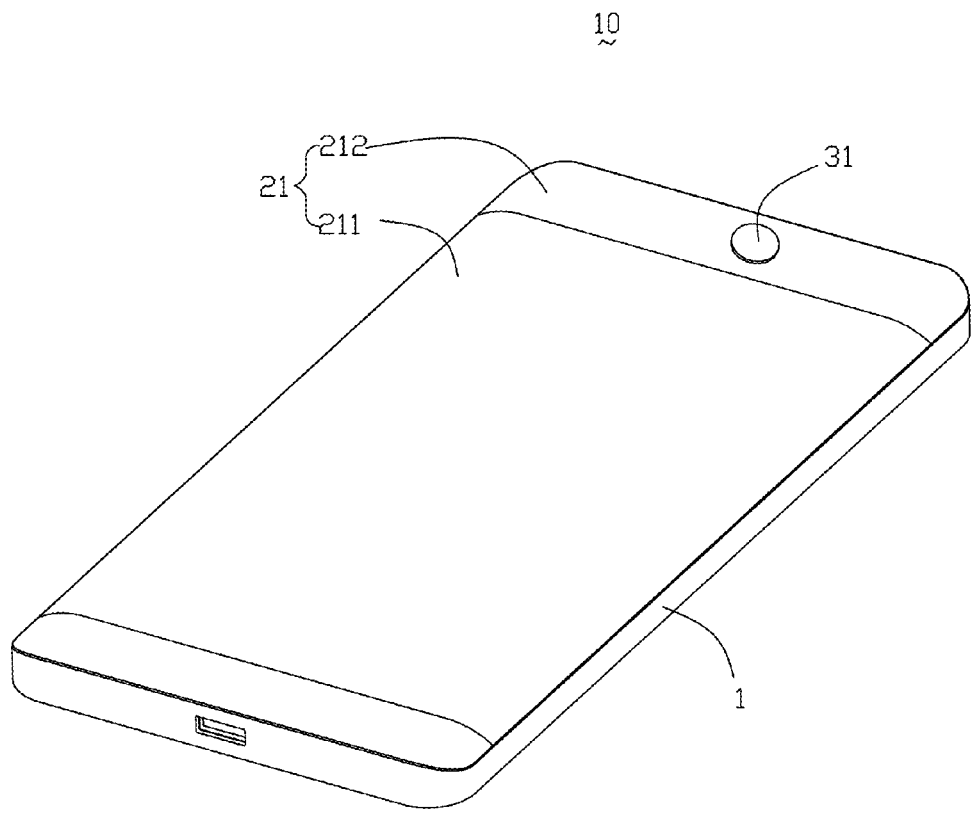
FIG. 1 an illustrative isometric of a mobile terminal device according to a first exemplary embodiment of the present invention.
Figure 2:
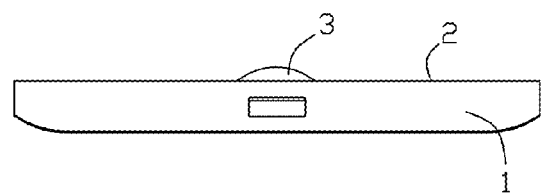
FIG. 2 is side view of the mobile terminal device in FIG. 1.
Figure 3:
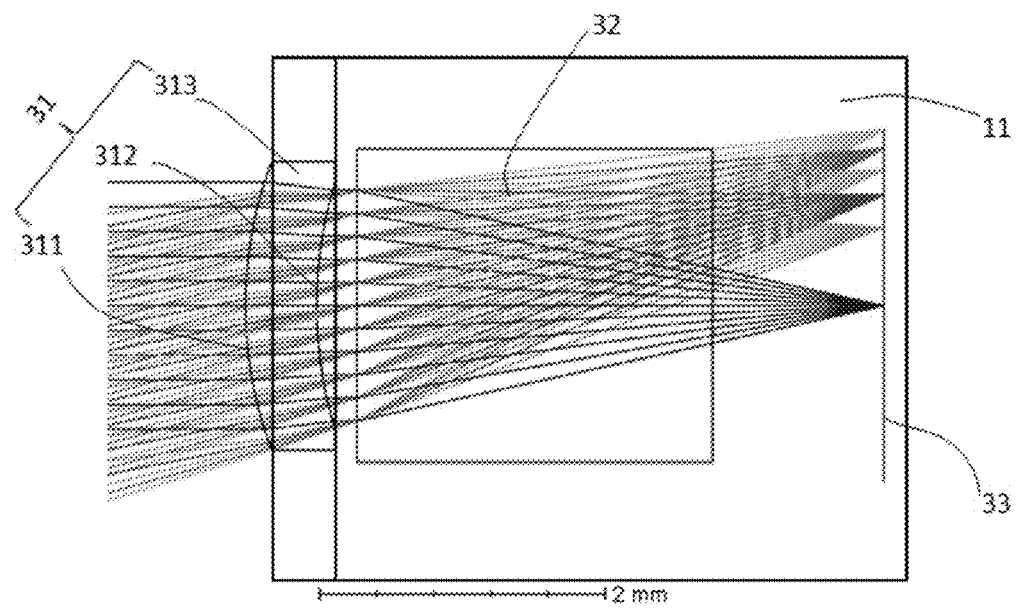
FIG. 3 is a schematic cross-sectional view of the mobile terminal device in FIG. 1.

Referring to FIGS. 1-3, a mobile terminal device 10 in accordance with a first exemplary embodiment of the present invention comprises an housing 1 with a receiving space 11, a display 2 mounted on the housing 1 and an optical system 3 connecting the display 2 and partially received in the receiving space 11. The display 2 comprises a cover glass 21. The cover glass 21 has an active area 211 for displaying information and an edge area 212 connecting with the active area 21.

The optical system 3 comprises an optical element 31 integrated in the edge area 212 of the display 2, a main lens 32 received in the receiving space 11 behind the optical element 31, and an image sensor 33 provided in the receiving space 11. The optical element 31, the main lens 32 and the image sensor 33 are arranged in this order from an object side to an image plane side. The optical element 31 cooperates with the main lens 32 and the image sensor 33 for forming a whole optical system 3 for capturing pictures and video footages, implementing illuminations, or the like. The optical element 31 comprises a front surface 311, a back surface 312 opposite to the front surface 311 near the main lens 32, and a connecting wall 313 connecting the front and back surfaces 311, 312. The front surface 311 is convex surface facing the object side and the back surface 312 is concave surface facing the image plane side. Referring to FIG. 3, an EFL of the mobile terminal device without the optical element 31 is 4 mm. The optical system 31 assembled with the main lens 32 converts the EFL of the mobile terminal device form 4 mm to 3.7 mm.

Figure 4:
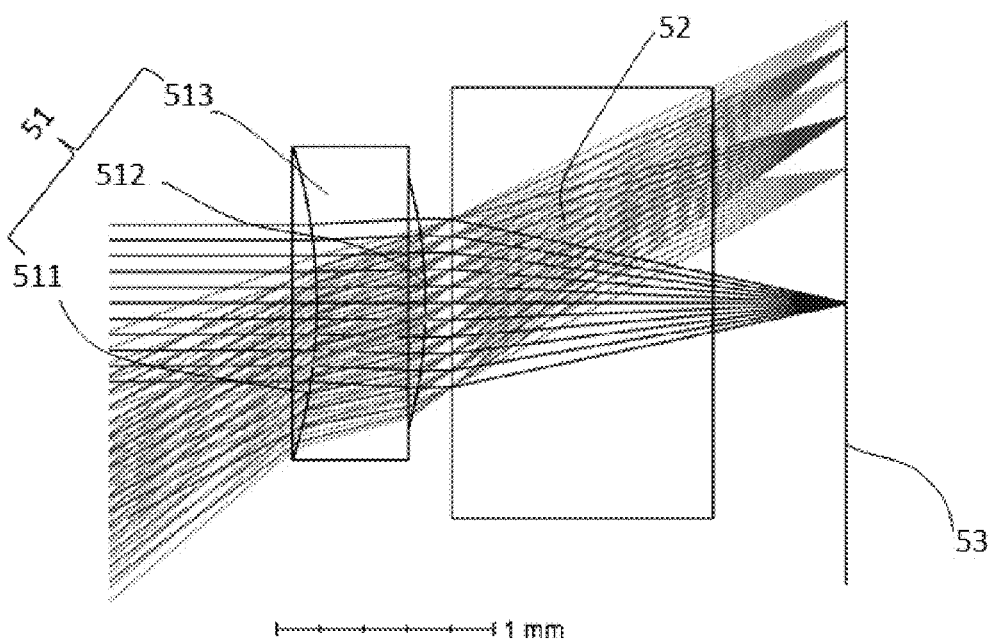
FIG. 4 is a schematic cross-sectional view of a mobile terminal device according to a second exemplary embodiment of the present invention.

A second embodiment of the present invention is shown in FIG. 4, FIG. 4 shows a mobile terminal device similar to the first embodiment of the present invention except that an optical system 5. The optical system 5 comprises an optical element 51 integrated in the edge area 212 of the display 2, a main lens 52 received in the receiving space 11 behind the optical element 51, and an image sensor 53 provided in the receiving space 11. The optical element 51, the main lens 52 and the image sensor 53 are arranged in this order from an object side to an image plane side. The optical element 51 cooperates with the main lens 52 and the image sensor 53 forming a whole optical system 5 for capturing pictures and video footages, implementing illuminations, or the like. The optical element 51 comprises a front surface 511, a back surface 512 opposite to the front surface 511 near the main lens 52, and a connecting wall 513 connecting the front and back surfaces 511, 512. The front surface 511 is concave surface facing the object side and the back surface 512 is convex surface facing the image plane side. Referring to FIG. 4, an EFL of the mobile terminal device without the optical element 51 is 2 mm. The optical system 51 assembled with the main lens 52 converts the EFL of the mobile terminal device form 2 mm to a wide angle 1.7 mm.

According to different desires such as simple production or higher quality, optical shapes of the optical element are convex or concave, or combination of both. The optical element is integrated in the edge area of the display by very high pressure molding or hot-embossing with hard metal mold and with low roughness, thereby the cover glass and the optical element form an integral unit. It is optional that the hard metal mold is made from Tungsten Carbide. A better overall optical system can be fitted within the overall thickness of housing, thereby improving image quality of the optical system and quality of flash illumination.

The optical elements of the optical system is integrated in the cover glass, thereby effectively allowing increased optical track length without increasing the overall thickness of the mobile terminal device. This enables reduction of the overall thickness of the mobile terminal device and/or improved quality and/or improved functionality.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A mobile terminal device, comprising:
   a display having a cover glass, the cover glass having an active area for displaying information and an edge area connecting with the active area;
   an optical system assembled with the display and comprising an optical element integrated in the edge area of the display for forming an integral unit and a main lens cooperating with the optical system for taking pictures.

2. The mobile terminal device as described in claim 1, wherein the optical element is integrated in the edge area of the display by pressure molding.

3. The mobile terminal device as described in claim 1, wherein the optical element is integrated in the edge area of the display by hot-embossing.

4. The mobile terminal device as described in claim 3, wherein optical shapes of the optical element is convex or concave, or a combination of both.

* * * * *